United States Patent
Adams et al.

[11] 3,906,993
[45] Sept. 23, 1975

[54] DUAL DIRECTION FLOATING VALVE SEAT

[75] Inventors: Cecil E. Adams; Leo H. Dillon, both of Columbus, Ohio

[73] Assignee: Abex Corporation, New York, N.Y.

[22] Filed: Oct. 16, 1974

[21] Appl. No.: 515,271

[52] U.S. Cl. .............. 137/540; 137/491; 251/360
[51] Int. Cl.² ...................... F16K 1/42; F16K 25/00
[58] Field of Search .......... 137/540, 542, 543, 491, 137/246, 543.13; 251/359, 360, 362

[56] References Cited
UNITED STATES PATENTS

| | | | |
|---|---|---|---|
| 2,330,610 | 9/1943 | Nattel | 137/509 |
| 2,977,974 | 4/1961 | Browne | 137/543.13 X |
| 3,106,219 | 10/1963 | Teston | 137/510 |
| 3,411,535 | 11/1968 | Rosaen | 137/509 X |
| 3,534,941 | 10/1970 | Dunton | 251/360 |
| 3,650,291 | 3/1972 | Adams et al. | 137/491 |
| 3,713,461 | 1/1973 | Notelteirs | 137/246 X |

Primary Examiner—William R. Cline
Attorney, Agent, or Firm—Thomas S. Baker, Jr.; David A. Greenlee

[57] ABSTRACT

A control valve which has a poppet and a freely movable self-aligning seat. A groove is provided between a seat surface and a mating valve body surface and is in communication with a low pressure source providing a pressure imbalance which forces the seat against the valve body surface.

6 Claims, 4 Drawing Figures

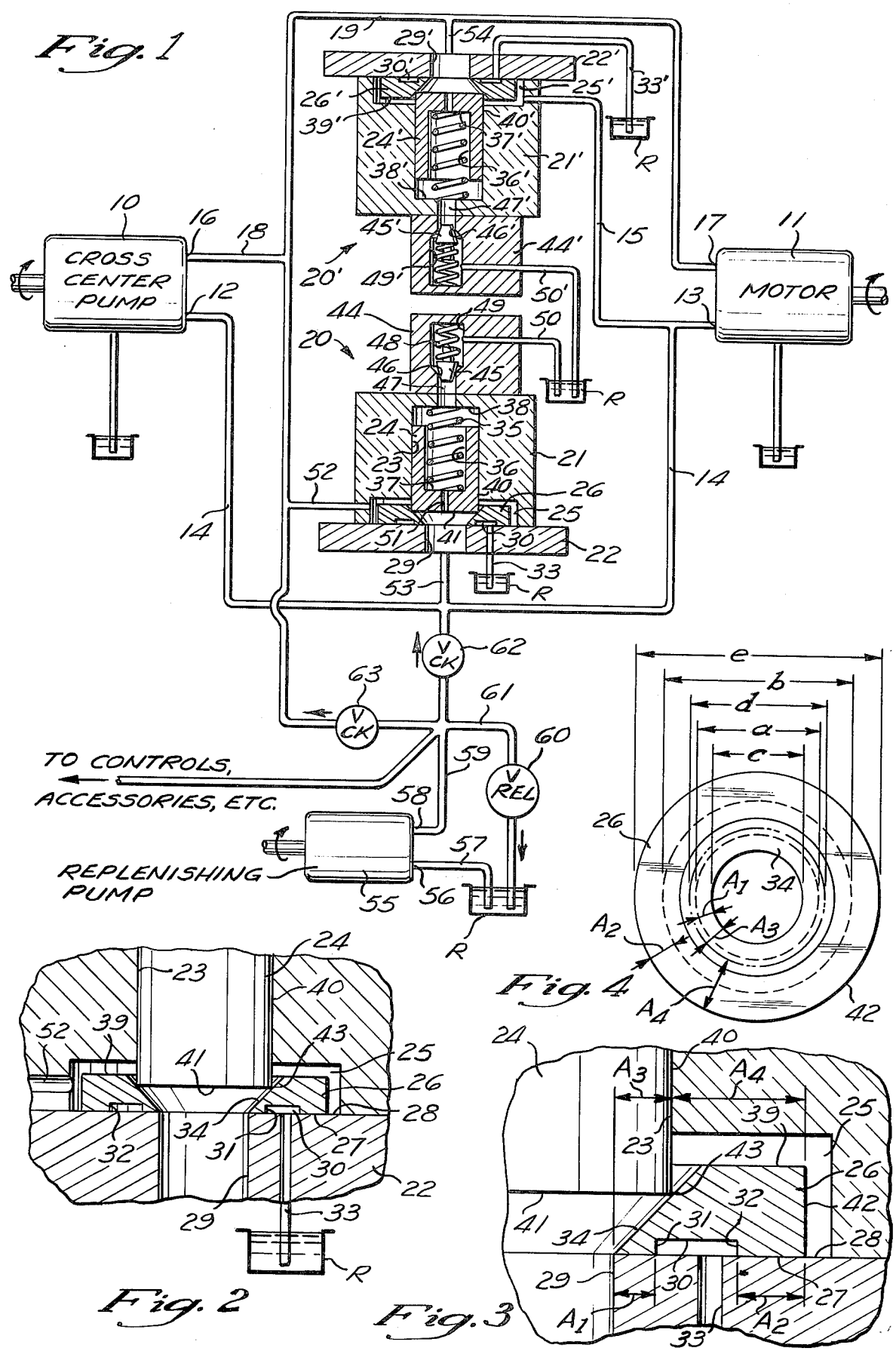

DUAL DIRECTION FLOATING VALVE SEAT

BACKGROUND OF THE INVENTION

I. Field of the Invention

The instant invention relates to a control valve having a poppet and a self-aligning seat which is clamped against the valve body irrespective of whether high pressure fluid is under the poppet or on top of the seat.

II. Description of the Prior Art

Control valves having needles, balls or poppets cooperating with self-aligning seats are shown in U.S. Pat. Nos. 2,330,610; 3,106,219 and 3,411,535. Each of these patents discloses a valve having a seat which is movable axially and radially so that it is self-aligning or self-centering with respect to an element which is biased into engagement with the seat. In U.S. Pat. Nos. 2,330,610 and 3,106,219, the movable element and seat control fluid passing through a bore in the seat. In U.S. Pat. No. 3,411,535, the movable element and seat seal a bore in the movable element.

When sufficient fluid pressure acts on the movable member in U.S. Pat. Nos. 2,330,610 and 3,106,219, fluid flows from the top of the valve seat through the bore into a port connected to the bottom of the seat.

In some instances, it is desirable to have a control valve with a self-aligning seat which remains sealed against the valve block when either high or low pressure fluid is above the seat. The aforementioned valves are unsuitable when high pressure fluid flows through or is in a port under the valve seat since fluid pressure acting underneath the seat tends to lift the seat from the valve body and leak high pressure fluid past the seat.

Further, in prior control valves, high pressure fluid acting on the outside of the poppet and on top of the self-aligning seat may change the setting of the control valve.

SUMMARY OF THE INVENTION

The instant invention provides a control valve having a poppet and a self-aligning valve seat which is clamped against the valve block irrespective of whether high pressure fluid is on top of the self-aligning valve seat or is flowing through the valve or is acting on the bottom of the poppet and beneath the valve seat. Furthermore, the instant invention provides a control valve in which the setting of the poppet is uneffected by high pressure fluid acting on the sides of the poppet and on top of the self-aligning valve seat.

DESCRIPTION OF THE DRAWINGS

FIG. 1 is a schematic view of a pair of control valves according to the instant invention in a hydraulic circuit.

FIG. 2 is an enlarged detail view of a poppet and self-aligning valve seat shown in FIG. 1.

FIG. 3 is an enlarged view of a portion of the poppet and valve seat of FIG. 2.

FIG. 4 is an enlarged plan view of the valve seat.

DESCRIPTION OF THE PREFERRED EMBODIMENT

FIG. 1 illustrates a hydraulic circuit having an across-center pump 10 which is driven by a prime mover, not shown, and drives a fluid motor 11 which provides power to operate a mechanical device, not shown. Port 12 of pump 10 is connected to port 13 of motor 11 through lines 14, 15. Port 16 of pump 10 is connected to port 17 of motor 11 through lines 18, 19. A pair of identical control valves 20, 20' of the instant invention are utilized in the hydraulic circuit shown in FIG. 1. The operation of the circuit will follow a detailed description of control valve 20. Since valves 20, 20' are identical, the description will refer to valve 20 and identical elements on valve 20' will be indicated by identical primed numbers.

Control valve 20 has a valve body 21 clamped to a valve block 22 by conventional fastening means, not shown. A bore 23 in valve body 21 receives a close fitting cylindrical poppet 24 and opens into a cylindrical cavity 25 between valve body 21 and block 22 which receives a freely movable self-aligning cylindrical seat 26. Cavity 25 is large enough to permit seat 26 to move axially and radially therein.

Referring to FIGS. 2 and 3, it can be seen that seat 26 has a flat bottom surface 27 which seats against a flat surface 28 on valve block 22 and overlies a port 29 formed therein. A circular drain groove 30 formed in the bottom surface 27 of seat 26 has an inner wall 31 having a diameter $a$ and an outer wall 32 having a diameter $b$ and permits fluid that leaks between surfaces 27 and 28 to flow to a reservoir R through a line 33.

Seat 26 has a tapered or frusto-conical bore 34 having an inner diameter $c$. A spring 35 in a bore 36 in poppet 24 acts between the bottom 37 of bore 36 and the bottom 38 of bore 23 to bias poppet 24 downwardly into engagement with seat 26. If the seat 26 is not perfectly aligned, the camming action between the edge of poppet bottom 41 and the tapered surface of bore 34 will move seat 26 radially until it is aligned or centered with respect to poppet 24. As best seen in FIGS. 2–4, poppet 24 engages seat 26 along a circular line having a diameter $d$ which lies between drain groove diameters $a$, $b$.

Poppet 24 and seat 26 are so designed that, when high pressure fluid is in cavity 25 or in port 29 or in both, fluid pressure will clamp seat 26 against valve block surface 28. Referring to FIGS. 3 and 4, the annular area between diameters $c$ and $a$ is designated $A_1$ and the annular area between diameter $b$ and the diameter $e$ of the periphery 42 of seat 26 is designated $A_2$. The effective annular area, i.e. $\pi(d^2-c^2)/4$ between diameters $c$ and $d$ is designated $A_3$ and the effective annular area i.e. $\pi(e^2-d^2)/4$ between diameters $d$ and $e$ is designated $A_4$.

When high pressure fluid is in port 29, it will seep between surfaces 27 and 28. The fluid acting over area $A_1$ of seat bottom surface 27 produces a force tending to lift seat 26. When this fluid seepage reaches drain groove 30, it drops to the low pressure of the fluid in reservoir R. This seepage can occur because of a rough surface finish or imperfect flatness of the mating parts. Although in such cases there usually is a pressure gradient along the mating surfaces, for purposes of this description, the worst condition is assumed with full pressure acting across the entire width of the mating surface. Simultaneously, the high pressure fluid is also acting over area $A_3$ to produce a force tending to bias seat 26 downwardly against surface 27. Since effective area $A_3$ is greater than area $A_1$, the high pressure fluid in port 29 exerts a net downward force on seat 26.

When high pressure fluid is in cavity 25, the fluid acting on effective area $A_4$ produces a force tending to bias seat 26 downwardly against surface 27. High pressure fluid will seep between mating surfaces 27, 28 to act on area $A_2$ and produce a force tending to lift seat 26. Again, it will be presumed that full pressure acts on area $A_2$. When this fluid seepage reaches drain groove 30, it drops to the low pressure of the fluid in reservoir R. Since effective area $A_4$ is greater than area $A_2$, high pressure fluid in cavity 25 exerts a net downward force on seat 26. Thus, regardless of whether high pressure fluid is on either side of the valve, it will exert a net force seating seat 26 on surface 28.

When high pressure fluid in port 29 spills valve 20, the fluid flows around seat 26. The same pressure acts on areas $A_1$, $A_2$, $A_3$ and $A_4$. Since effective areas $A_3$ and $A_4$ are greater than areas $A_1$ and $A_2$, it is obvious that the fluid will exert a net downward force on seat 26. This eliminates valve seat chatter which could cause wear.

In the instant valve, the drain groove could be formed in valve block surface 28 and control valve 20 would be operable if poppet 24 engaged seat 26 along a circle having a diameter greater than the inside diameter of the groove.

As best seen in FIG. 1, the pressure setting of valve 20 is set by a conventional pilot assembly 44. Assembly 44 includes a poppet 45 urged against a seat 46 covering a passage 47 by a spring 48 in a cavity 49. Cavity 49 is connected to reservoir R through line 50. When pilot assembly 44 spills, fluid flows through an orifice 51 in poppet 24, passage 47, cavity 49 and line 50 to reservoir R. This causes the pressure of the fluid above poppet 24 to be limited to a preset value, and a slightly higher pressure on the bottom 41 of poppet 24 will thereby cause poppet 24 to lift from seat 26, and spill excess fluid into a line 52 connected to the low pressure port of pump 10. Valve 20' spills fluid into line 15.

The hydraulic circuit in FIG. 1 illustrates control valve 20 of the instant invention in a hydraulic circuit where port 29 is subjected to high and low pressure fluid and cavity 25 is subjected to high pressure fluid. Line 14 is connected to port 29 in valve block 22 by line 53 and to cavity 25' in valve body 21' by line 15. Similarly, line 19 is connected to port 29' in valve block 22' by line 54 and to cavity 25 in valve body 21 by line 52. If pump port 12 has high pressure fluid, lines 14 and 15 likewise have high pressure fluid. At the same time, lines 18 and 19 would be connected to low pressure port 16.

The hydraulic circuit in FIG. 1 has a closed loop between the pump 10 and motor 11 which requires some means for replacing fluid lost through the pump and motor pistons, shoes and port plates during operation. To replace this fluid, a replenishing pump 55, having an inlet port 56 connected to reservoir R through line 57 and a discharge port 58 connected to line 59, is utilized. Pump 55 may also supply accessories or controls. A relief valve 60, connected to line 59 through line 61 and to reservoir R, limits the discharge pressure of pump 55 to considerably below the outlet pressure of pump 10. When line 14 has high pressure fluid from pump 10, a check valve 62 in line 59 is closed to prevent high pressure fluid from entering the replenishing circuit. At the same time, line 19 which has low pressure fluid is connected to the replenishing circuit through a check valve 63 which is open and replenishing fluid is supplied to the inlet port 16 of pump 10 through lines 19 and 18. The replenishing fluid which flows through lines 18, 19 also flows through line 52 to cavity 25. However, since poppet 24 is uniformly cylindrical, the pressurized replenishing fluid in cavity 25 does not affect the setting of valve 20.

When pump 10 is stroked across center and high pressure fluid is in lines 18 and 19, check valve 63 is closed. Simultaneously, low pressure fluid is in lines 14, 15 and check valve 62 is open to supply replenishing fluid to port 12 through line 14. The replenishing fluid also flows through line 15 to cavity 25'. For the reason previously stated, replenishing fluid in cavity 25' does not affect the setting of valve 20'.

Therefore, the control valve of the instant invention has a self-aligning valve seat which is clamped against the valve block when high pressure fluid is on either side of or flowing through the valve. Further, high pressure fluid acting on the outside surface of the poppet does not affect the pressure setting of the poppet.

Obviously those skilled in the art may make various changes in the details and arrangements of parts without departing from the spirit and scope of the invention as it is defined by the claims hereto appended. Applicants, therefore, wish not to be restricted to the precise construction herein disclosed.

Having thus described and shown one embodiment of the invention, what is desired to secure by Letters Patent of the United States is:

1. A pressure control valve comprising a valve body having a cavity, a valve seat freely movable within the cavity and having a bore and a bottom surface which engages a mating surface on the valve body, a port in said valve body mating surface, a drain groove in one of the surfaces which is connected to a low pressure source when the surfaces are engaged, a poppet, and means biasing the poppet into engagement with the valve seat to center the valve seat relative to the poppet with the bore aligned with the port, said engagement being along a line overlying the drain groove so that pressure fluid in the port beneath the poppet biases the valve seat toward seating engagement with the mating surface.

2. A pressure control valve comprising: a valve body mounted on a valve block, a bore in the valve body, a poppet mounted in the bore for reciprocal movement therein, an enlarged cavity adjacent one end of the bore for receiving a valve seat, a valve seat freely movable in the cavity, a generally flat surface on the bottom of the valve seat, a generally flat surface on the valve block upon which the bottom of the valve seat is seated, a drain groove in one of said flat surfaces having an inner and an outer periphery and connected to a low pressure zone, a port in the flat surface on the valve block, a tapered bore in the valve seat which receives the poppet and is aligned with the port, means for biasing the poppet into engagement with the valve seat such that the poppet engages the seat along a line having a diameter between the drain groove inside and outside peripheries.

3. A pressure control valve comprising a valve body affixed to a valve block, a valve seat having a tapered bore and freely movable in a cavity in the valve body and seating on the valve block, a drain groove in the bottom of the valve seat, the drain groove having an inside wall surface and an outside wall surface, a port in the valve block connected to the bottom of the valve seat, and an axially movable poppet biased into engagement with the valve seat to center the valve seat relative to the poppet, the poppet having a sealing surface which engages the tapered bore between the inside and outside wall surfaces of the drain groove so that pressure fluid on either side of the sealing surface biases the valve seat toward seating engagement with the valve block.

4. A pressure control valve having a valve body mounted on a valve block, a bore in the valve body, a poppet mounted in the bore for reciprocal movement therein, an enlarged cavity adjacent one end of the bore for receiving a valve seat, a valve seat freely movable in the cavity, a generally flat surface on the bottom of the valve seat, a generally flat surface on the valve block upon which the bottom of the valve seat is seated, a port in the flat surface on the valve block, an annular drain groove in one of the valve seat or the valve block flat surfaces, the annular drain groove having an inside diameter and an outside diameter, means for connecting the drain groove to a low pressure source to prevent high pressure fluid from collecting in said drain groove, a tapered bore in the valve seat for receiving the poppet, means for biasing the poppet into engagement with the valve seat to align the bore with the port, the poppet and tapered bore cooperating to cause the valve seat to automatically align itself in sealing engagement with the poppet, the poppet, seat and drain groove cooperating to provide a first effective area on the seat lying between a first circle defined by the inner diameter of said valve seat bore and a second circle on said valve seat defined by the line along which the poppet engages the tapered bore, a second annular area on the bottom surface of the valve seat lying between said first circle and a third circle defined by the inside diameter of the drain groove, the first effective area being greater than the second area such that high pressure fluid acting on the first and second areas produces a net force biasing the valve seat into seating engagement with the flat surface on the valve block.

5. A pressure control valve as recited in claim 4, including a third area on the bottom surface of the valve seat lying between the outside perimeter of the valve seat and a fourth circle defined by the outside diameter of the drain groove and a fourth effective area on the top of the valve seat lying between the second circle and the outside perimeter of the valve seat, the fourth effective area being greater than the third area such that high pressure fluid acting on the third and fourth areas provides a net force biasing the valve seat toward engagement with the flat surface on the valve block.

6. A pressure control valve as recited in claim 5, including means for setting the pressure at which the poppet will open, the poppet being substantially uniformly cylindrical such that pressure fluid in the cavity does not affect the pressure setting of the control valve.

* * * * *